US012371546B2

(12) United States Patent
Breyta et al.

(10) Patent No.: US 12,371,546 B2
(45) Date of Patent: Jul. 29, 2025

(54) FEEDSTOCK PURIFICATION OF POLYESTER WASTE FOR RECYCLING PROCESSES

(71) Applicant: TACLOV, LLC, Armonk, NY (US)

(72) Inventors: Gregory Breyta, San Jose, CA (US); Robert David Allen, Golden, CO (US)

(73) Assignee: Taclov, LLC, Armonk, NY (US)

( * ) Notice: Subject to any disclaimer, the term of this patent is extended or adjusted under 35 U.S.C. 154(b) by 0 days.

(21) Appl. No.: 18/377,884

(22) Filed: Oct. 9, 2023

(65) Prior Publication Data

US 2024/0043651 A1 Feb. 8, 2024

Related U.S. Application Data

(63) Continuation of application No. 17/540,176, filed on Dec. 1, 2021, now Pat. No. 11,814,487.

(60) Provisional application No. 63/120,354, filed on Dec. 2, 2020.

(51) Int. Cl.
C08J 11/20 (2006.01)

(52) U.S. Cl.
CPC ............ *C08J 11/20* (2013.01); *C08J 2323/06* (2013.01); *C08J 2323/12* (2013.01); *C08J 2367/03* (2013.01)

(58) Field of Classification Search
USPC .......................................................... 521/41
See application file for complete search history.

(56) References Cited

U.S. PATENT DOCUMENTS

| 3,284,348 | A | 11/1966 | Hutton |
| 3,666,791 | A | 5/1972 | Chikawa et al. |
| 3,668,235 | A | 6/1972 | Ichikawa et al. |
| 3,691,092 | A | 9/1972 | Floria |
| 4,003,880 | A | 1/1977 | Sidebotham et al. |
| 4,003,881 | A | 1/1977 | Sidebotham et al. |
| 4,064,079 | A | 12/1977 | Sidebotham et al. |
| 4,118,187 | A | 10/1978 | Sidebotham et al. |
| 4,137,393 | A | 1/1979 | Sidebotham et al. |
| 4,543,364 | A | 9/1985 | Nankee et al. |
| 7,030,264 | B1 | 4/2006 | Inada et al. |
| 7,211,193 | B2 | 5/2007 | Inada et al. |
| 9,255,194 | B2 | 2/2016 | Allen et al. |
| 9,550,713 | B1 | 1/2017 | Essaddam |
| 9,611,371 | B2 | 4/2017 | Walker |
| 9,914,816 | B2 | 3/2018 | Allen et al. |
| 10,087,130 | B2 | 10/2018 | Essaddam |
| 10,640,442 | B2 | 5/2020 | Essaddam |
| 2004/0182782 | A1 | 7/2004 | Inada et al. |
| 2015/0232632 | A1 | 8/2015 | Walker |
| 2016/0060419 | A1 | 3/2016 | Allen et al. |
| 2017/0008826 | A1 | 1/2017 | Essaddam |
| 2017/0152203 | A1 | 6/2017 | Essadam |
| 2017/0218162 | A1 | 8/2017 | Walker |
| 2018/0370894 | A1 | 12/2018 | Essaddam |
| 2019/0345306 | A1 | 11/2019 | Walker |
| 2022/0169822 | A1 | 6/2022 | Breyta |

FOREIGN PATENT DOCUMENTS

| CN | 105658611 | A | | 6/2016 |
| CN | 108359108 | A | | 8/2018 |
| CN | 108360144 | A | | 8/2018 |
| DE | 2328448 | A1 | | 2/1975 |
| DE | 207629 | A3 | | 3/1984 |
| FI | 71161 | C | | 11/1986 |
| GB | 2528494 | A | | 1/2016 |
| JP | 2006037084 | A | * | 2/2006 |
| KR | 20030027085 | A | * | 4/2003 |
| PL | 173394 | B1 | | 8/1995 |
| TW | 201710341 | A | | 3/2017 |
| WO | 2019051597 | A1 | | 3/2019 |
| WO | 2021032826 | A1 | | 2/2021 |
| WO | 2022118243 | A1 | | 6/2022 |

OTHER PUBLICATIONS

Taiwan Patent Office, "Office action issued," Jul. 11, 2024, 3 Pages, Application No. 110145115.
IBM Patents or Patent Applications Treated as Related, Oct. 9, 2023 (pp. 1-2).
International Search Report and Written Opinion for the counterpart PCT Applicatoin No. PCT/IB2021/061239 dated Mar. 2, 2022 (11 pages).
Office Action Response to Rule 161(1) dated Nov. 17, 2023, Application No. 21900192.2, 36 pages.

\* cited by examiner

*Primary Examiner* — Terressa Boykin
(74) *Attorney, Agent, or Firm* — Kilpatrick Townsend & Stockton LLP

(57) ABSTRACT

Pre-treating a waste polyester material with dichloromethane (DCM) produce purified polyester for reuse. The purified polyester can be recycled via any chemical or mechanical recycling process. Where the waste polyester material includes non-polyester contaminants, the DCM-treated polyester material produces a slurry that includes the DCM, a solid component that includes a polyester monomer product for reuse, and a waste liquid component where the non-polyester contaminants can be filtered from the top of the liquid component.

16 Claims, 9 Drawing Sheets
(8 of 9 Drawing Sheet(s) Filed in Color)

Time Sequence Extraction of PET Color Flake and Dirty Mixed Curbside PET Flake

Color Flake DCM Extracts
@ 1, 2, 3, 4, 5, 6, 72 hrs

Dirty Mix Curbside Flake Extracts
@ 1, 2, 3 hrs

FEEDSTOCK PURIFICATION OF POLYESTER WASTE FOR RECYCLING PROCESSES

TECHNICAL FIELD

The present invention relates generally to recycling processes and more specifically to a method of purifying waste polyester feedstock with dichloromethane (DCM) prior to the initiation of a recycling process.

BACKGROUND OF THE INVENTION

The presence of impurities in low quality plastic waste causes problems in the efficiency and effectiveness of chemical and mechanical recycling of plastic waste. For example, small amounts of impurities (such as dyes, pigments, dirt, and foreign or dissimilar polymers) in monomer or polymer feed streams can be highly detrimental to the quality of the incoming feedstock and result in severe degradation of the mechanical, optical, and/or barrier properties of the reformed polymer.

Chemical recycling uses waste plastic or waste textiles as a feedstock. The recycling process dissolves polymers and/or produces monomers used in the preparation of new plastic. Very high purity (>99%) is required for the monomers to make new high molecular weight polyester via step-growth/condensation polymerization. An on-going challenge in chemical recycling is how to take a low quality, compositionally fluctuating feedstock and process it through depolymerization and monomer purification to create an end product (a monomer) that is of the quality required for condensation (or step-growth) polymerization. Currently, post-reaction purification is carried out by decolorization and deionization through treatment with activated carbon and ion exchange resins. While these techniques, along with pre-reaction distillation, are largely successful in removing impurities, including color, the dirtier and more colored the input, the more frequent the regeneration of purification media must occur. The process to reactivate spent or contaminated activated carbon is typically pyrolytic (at temperatures ranging from 600-900° C.), which incurs a large energy cost. Further, ion exchange bed regeneration, which involves backflow washing with dilute acid or base, incurs environmental waste and/or the need for additional processing.

Mechanical recycling can only use colorless inputs that have been stringently cleaned. Because mechanical recycling has zero tolerance toward foreign matter, a great deal of plastic is rejected in the sorting process. Within the context of polyethylene terephthalate (PET) bottles, a batch of PET bottles with just 1% of polyolefins (e.g., bottle caps, rings, labels, etc.) will not qualify for mechanical recycling and will be rejected. Due to these limitations, mechanical recycling is a low recovery recycling process (<57%).

SUMMARY OF THE INVENTION

In one aspect, the present invention relates to a method comprising: purifying a waste material comprising a polyester by treating the waste material with dichloromethane (DCM); and recovering purified polyester for recycling from the DCM-treated waste material.

In another aspect, the present invention relates to a method comprising: purifying a waste material comprising a polyester terephthalate (PET) by treating the waste material with dichloromethane (DCM); and recovering purified PET for recycling from the DCM-treated waste material.

Additional aspects and/or embodiments of the invention will be provided, without limitation, in the detailed description of the invention that is set forth below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
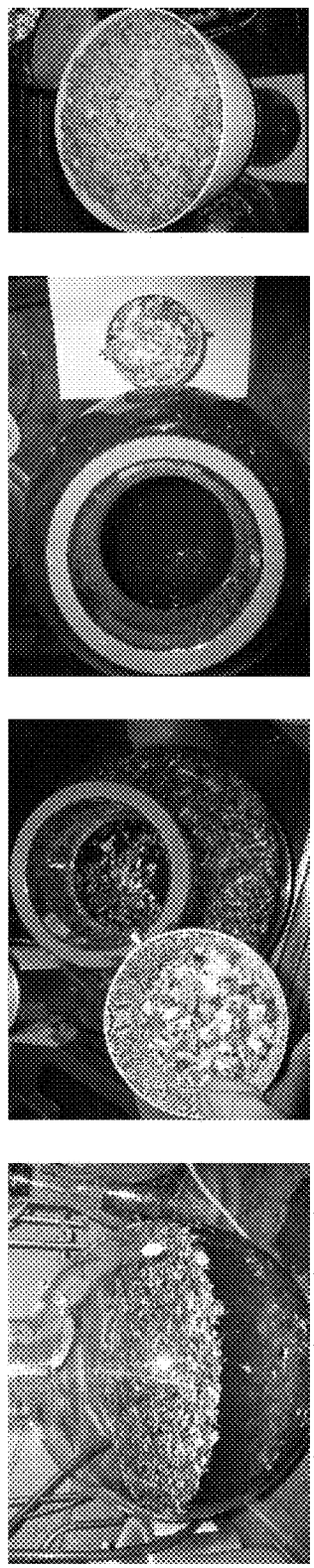
FIG. 1 are photographs showing the separation products resulting from the pre-treatment of PET dirty-mixed flake with dichloromethane (DCM) (Example 1).

Set forth below is a description of what are currently believed to be preferred aspects and/or embodiments of the claimed invention. Any alternates or modifications in function, purpose, or structure are intended to be covered by the appended claims. As used in this specification and the appended claims, the singular forms "a," "an," and "the" include plural referents unless the context clearly dictates otherwise. The terms "comprise," "comprised," "comprises," and/or "comprising," as used in the specification and appended claims, specify the presence of the expressly recited components, elements, features, and/or steps, but do not preclude the presence or addition of one or more other components, elements, features, and/or steps.

As used herein, the term "mechanical recycling" refers to a recycling process that maintains the molecular structure of a waste polyester product by chipping the polyester waste and remelting and extruding to make recycled pellets that are ready for remolding applications or directly formed into new commodities. Mechanical recycling requires uncontaminated, color free waste streams, which requires thorough sorting and cleaning such that only similar materials are recycled together and have no or little color content.

As used herein, the term "chemical recycling" refers to a process by which a plastic polymer is chemically reduced to its original monomer so that it can be repolymerized and remade into a new plastic material. With chemical recycling, plastic waste streams can be converted back into feedstock for further recycling. Unlike mechanical recycling, which requires sorted single-stream plastic waste, chemical recycling can be used for mixed post-consumer plastic waste streams, which consist of polyethylene (PE), polypropylene (PP), and polystyrene (PS). Chemical recycling is also more tolerant of colorant and dirt content than mechanical recycling. Chemical recycling processes include, without limitation, solvent dissolution and depolymerization processes. Examples of depolymerization recycling reactions include, without limitation, alcoholysis (e.g., glycolysis and methanolysis), solvolysis, hydrolysis, acidolysis, phosphorolysis, aminolysis, ammonolysis, enzymolysis, and other interchange reactions that produce oligomers or monomers. By way of clarification, within the context of the depolymerization of polyesters, with alcoholysis, a transesterification reaction occurs where the alcohol group cleaves the ester bonds of the polymer.

As used herein, the term "glycolysis depolymerization" refers to a depolymerization recycling process where a glycol is inserted into the polymeric chains breaking the ester linkages and replacing them with hydroxyalkyl terminals. Examples of glycols used in glycolysis depolymerization include, without limitation, ethylene glycol, diethylene glycol, propylene glycol, 1,3-propanediol, 1,4-butanediol, cyclohexanedimethanol, and dipropylene glycol.

As used herein, the term "solvent dissolution" refers to a chemical recycling process where a solvent is used to dissolve polymers and separate them from other materials.

As used herein, the term "filtering" is meant to include any process that separates solids from liquids. Examples of filtration processes including without limitation, mechanical filtration (such as skimming), general filtration using gravity, vacuum filtration, cold filtration, hot filtration, and combinations thereof.

Described herein is a method to simultaneously remove multiple impurities from polyester waste samples (also referred to herein as "feedstock") through treatment with dichloromethane (DCM). Examples of polyester feedstock include without limitation, plastic waste as previously described herein and polyester fibers and/or fabrics, which may include clothing, yarns, piles, carpets and carpet fibers. As will be appreciated by those of skill in the art, polyester fibers and/or fabrics may include dye contents higher than those found in plastic packaging waste. Once treated with DCM, the feedstock can be used in any mechanical or chemical recycling process, including, without limitation, solvent dissolution and glycolysis recycling processes. For purposes of the discussion that follows, polyethylene terephthalate (PET) flake will be referenced as an exemplary polyester feedstock; however, it is to be understood that the purification method described herein may have applicability with any polyester feedstock.

Figure 2:
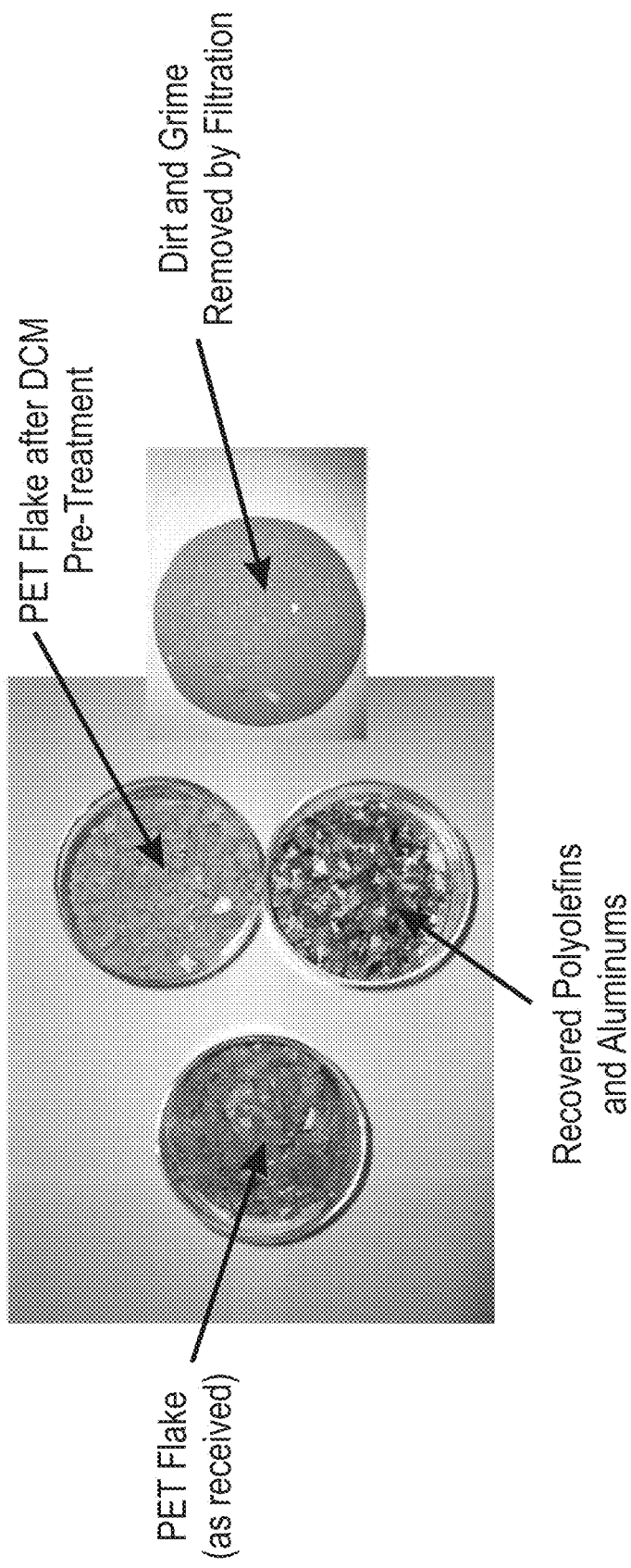
FIG. 2 are photographs showing a comparison of the incoming PET dirty-mixed flake and the recovered clean PET product along with the removed polyolefins recovered and dirt removed using the pre-treatment with DCM (Example 2)

With reference to the figures, when PET flake is treated with liquid DCM, a PET/DCM slurry forms. The density difference between the PET (1.38 g/cm$^3$) and the DCM (1.33 g/cm$^3$) is enough to cause the PET flake to settle to the bottom of the slurry while impurities with lower density float where they can be filtered (e.g., through skimming) from the surface leaving a purified PET sample (FIG. 1). Where the PET input is colored, the DCM removes dyes and colorants from the sample (FIGS. 3-7). DCM can also remove dirt and grime from the PET and bring it into suspension where it can be easily removed by filtration (FIG. 2). As dirt and grime are known to introduce metallic and ionic impurities into recycling processes, the application of DCM can further purify PET feedstock (FIGS. 1, 2). Once purified, the PET sample can proceed to a recycling process and the DCM can also be recycled for reuse through filtration and a vaporization process, such as, for example, low energy distillation at 40° C.

Examples of impurities that may be removed from polyester feedstocks with the DCM treatment include, without limitation, non-ester polymers, physical dirt and/or grime, colorants, organic impurities, metallic and ionic impurities, and combinations thereof. One non-limiting example of an organic impurity is acetaldehyde or its acetal. Examples of metallic impurities include, without limitation, aluminum or aluminum-containing films, iron and copper as wire or powder. Examples of non-ester polymers that are present in polyester feedstock include, without limitation, polymers such as polyolefins (which are found in bottle caps), polyamides (e.g., nylon), polyimides, polyurethanes, and polyvinylchloride, many of which have densities that are lower than the density of PET and DCM. For example, the polyolefin polyethylene (PE) has a density of ~0.85 g/cm$^3$ for amorphous PE and ~1.0 g/cm$^3$ for crystalline PE; the polyolefin polypropylene (PP) has a density of 0.895-0.92 g/cm$^3$; and the polyamide nylon has a density of ~1.15 g/cm$^3$.

There are many advantages to using DCM purification on polyester feedstock. For example, treatment with DCM minimizes or overcomes the need to carry out costly and labor and energy intensive post-reaction and/or post-processing purification procedures that are currently used in polyester recycling processes, such as, filtration, decolorization, and demetallization/deionization. Further, the use of DCM purification for the removal of non-ester polymers from polyester feedstock minimizes or eliminates reactor contamination and resultant down time. The use of DCM purification for the removal of dirt and/or grime from polyester feedstock also decreases the need for purification media, such as ion exchange. The application of DCM thus reduces the need to regenerate ion exchange media, the latter of which produces its own undesirable waste streams. Application of DCM purification for the removal of color from polyester feedstock further decreases the need for carbon bed regeneration, a labor intensive and costly process that is generally carried out ~900° C.

By contrast, DCM, which is recoverable from the polyester feedstock, is indefinitely reusable and does not generate any additional waste to the recycling process. Removal of impurities from a polyester feedstock sample with DCM purification results in a cleaner and more efficient recycling process. DCM is recoverable from purified polymer by filtration at room temperature (Examples 1, 2, 5, 8), or optionally at elevated temperature (Examples 3, 4, 6, 7). The recycling of the DCM is carried out with distillation at about 40° C. (i.e., the boiling point of DCM), rather than the much higher temperatures required for activated carbon regeneration.

The DCM purification described herein may be used with any recycling process to increase product purity and reduce processing costs, time, waste and complexity.

In one embodiment, the DCM purification is used in an alcoholysis depolymerization recycling process. One non-limiting alcoholysis depolymerization recycling process is the volatile catalyst (VolCat) chemical recycling process described in U.S. Pat. No. 9,255,194 B2 to Allen et al. and U.S. Pat. No. 9,914,816 B2 to Allen et al. In one embodiment, the VolCat process depolymerizes polyester with an alcohol solvent and an organocatalyst in a reactor at a temperature at or higher than the boiling point of the alcohol. In another embodiment, the organocatalyst has a boiling point at least 50° C. lower than the boiling point of the alcohol solvent and the depolymerization is run at a temperature higher than the boiling point of the alcohol solvent. In a further embodiment, the organocatalyst has a boiling point at least 50° C. lower than the boiling point of the alcohol solvent and the depolymerization is run at a temperature higher than the boiling point of the organocatalyst. In another embodiment, the polyester input and the alcohol solvent are heated to a reaction temperature of about 200-250° C. prior to the introduction of the organocatalyst. Reaction products from the VolCat depolymerization are monomeric and/or oligomeric diesters from the polyester as well as recovered organocatalyst and excess alcohol solvent, the former of which is intended for reuse into recycled polyester products and the latter of which may also be reused in subsequent depolymerization reactions.

In another embodiment, the VolCat reaction is carried out in a chemical reactor, which may be a pressure reactor, such as an autoclave or extrusion reactor, or a non-pressurized reactor, such as a round bottom flask. In a further embodiment, the depolymerization reaction, which may be pressurized or non-pressurized, as well as one or more optional purification steps for the monomer product are carried out in batches and/or in a continuous flow process. In another embodiment, a solvent in which the monomer product has limited solubility may be used to purify the depolymerized polyester monomer product, whether obtained in a batch process or though continuous flow. Alcohol and/or water are non-limiting examples of such purification solvents. Where an alcohol is used for the purification, the alcohol may be the unreacted alcohol from the depolymerization reaction or a newly introduced clean alcohol. In a further embodiment, the recovered monomer product obtained from the VolCat reaction may be used to produce a new polymer material.

In another embodiment, the polyester is selected from the group consisting of polyethylene terephthalate (PET), polyethylene naphthalate (PEN), polybutylene terephthalate (PBT), polytrimethylene terephthalate (PTT), polyethylene furanoate (PEF), and combinations thereof. In a further embodiment, the alcohol solvent is a glycol and/or diol solvent. In another embodiment, the alcohol solvent is selected from the group consisting of 1,2-ethanediol (ethylene glycol, EG), 1,3-propanediol (trimethylene glycol), 1,4-butanediol (tetramethylene glycol), 1,5-pentanediol (pentylene glycol), and combinations thereof. In a further embodiment, the organocatalyst is an amine organocatalyst and/or carboxylic salt of same. In another embodiment, the amine of the amine organocatalyst and/or carboxylic acid salt of same is a tertiary amine. In a further embodiment, the amine organocatalyst and/or carboxylic acid salt of same is selected from the group consisting of triethylamine (TEA), tetramethylethylenediamine (TMEDA), pentamethyldiethylenetriamine (PMDETA), trimethyl triaza cyclononane (TACN), 4-(N,N-dimethylamino)pyridine (DMAP), 1,4-diazabicyclo [2.2.2]octane (DABCO), N-methyl imidazole (NMI), and combinations thereof. In another embodiment, the amine organocatalyst and/or carboxylic acid salt of same is TEA and/or a carboxylic acid salt of same. In a further embodiment, the polyester input comprises a terephthalate and the recovered depolymerized reaction product comprises a terephthalate ester monomer. In another embodiment, the polyester input comprises PET and the recovered polyester monomer product is bis(2-hydroxyethyl)terephthalate (BHET). In a further embodiment, the polyester input comprises PET, the alcohol is EG, the amine organocatalyst is TEA and/or a carboxylic salt of same, and the recovered reaction products comprise unreacted EG, the TEA, and BHET.

In another embodiment, the DCM purification may be combined with a pre-reaction distillation, the latter of which removes water, residual DCM, and other volatile impurities from the polyester and enhances the efficiency of the VolCat recycling process. The application of the DCM purification to the feedstock in the VolCat recycling process (with or without pre-reaction distillation) minimizes the need for the application of decolorants and the use of ion-exchange in order to purify the output product, thus reducing the processing time and the cost for running VolCat recycling.

The descriptions of the various aspects and/or embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the aspects and/or embodiments, the practical application or technical improvement over technologies found in the marketplace, or to enable others of ordinary skill in the art to understand the aspects and/or embodiments disclosed herein.

EXPERIMENTAL

The following examples are set forth to provide those of ordinary skill in the art with a complete disclosure of how to make and use the aspects and embodiments of the invention as set forth herein. While efforts have been made to ensure accuracy with respect to variables such as amounts, temperature, etc., experimental error and deviations should be taken into account. Unless indicated otherwise, parts are parts by weight, temperature is degrees centigrade, and pressure is at or near atmospheric. All components were obtained commercially unless otherwise indicated.

Example 1

Figure 4:
FIG. 4 are photographs showing time sequence DCM extracts obtained from DCM-treated PET color and dirty-mixed flake (Examples 1 and 2).
Figure 4:
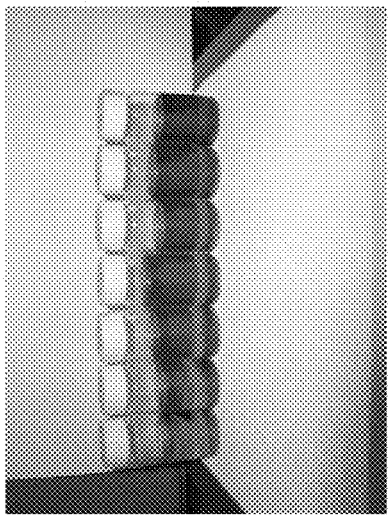

DCM Purification of Dirty-Mixed Pet Flake 2.5 kg of curbside mixed PET flake was added to a 22 L glass reactor along with 12 L DCM and stirred gently at room temperature. The DCM immediately took up a surprising amount of color even before stirring. Samples of DCM were taken at 1, 2, and 3 hours followed by the skimming of less dense material from the surface of the liquid, which was found to be PE, PP, and an aluminum-containing film. Much of the dirt and grime that was originally on or in the dirty PET was released into the DCM liquid and was easily filtered from the liquid leaving cleaned PET flakes, which were easily recovered via subsequent filtration. There was very little colored material in the resultant product either as polyolefin or color remaining in the PET. FIG. 1, panel 1 shows PET submerged in DCM (which has taken up color) with polyolefins and aluminum foil afloat. FIG. 1, panel 2, shows the removal of floating material from the surface of the DCM liquid and dirt/grime with a wire mesh screen and FIG. 1, panel 3, shows dirt/grim suspended in the remaining DCM liquid. FIG. 1, panel 4 shows the recovered purified PET flake. FIG. 2 shows the input curbside dirty-mixed PET flake (left panel), the purified PET (top center), the recovered polyolefins and aluminum (bottom center), and the filtered dirt and grime removed during filtration (right panel). FIG. 4 (right) shows the three DCM solution time-sequence samples.

Example 2

Figure 3A:
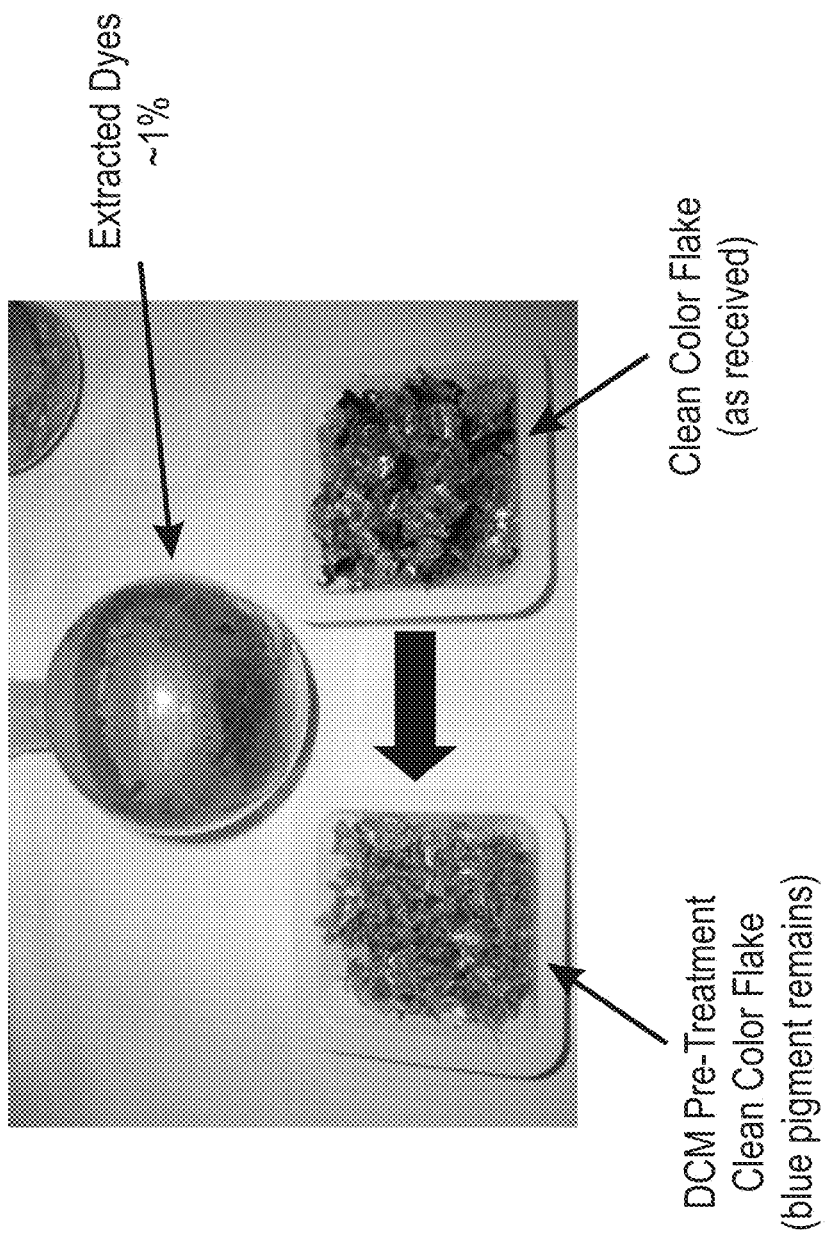
FIGS. 3A and 3B are photographs showing products resulting from pre-treatment of PET color flake with DCM (Example 2).
Figure 3B:

DCM Purification of Clean-Color Pet Flake 2.5 kg of clean-color PET flake was added to a 22 L glass reactor along with 12 L DCM and stirred gently at room temperature. The DCM immediately became a dark color even before stirring. Samples of DCM were taken at 1, 2, 3, 4, 5, 6, and 24 hours followed by recovery of the PET flakes by filtration. FIG. 3A shows a portion of the clean-color PET flake before (left) and after (right) DCM treatment along with a portion of the extracted dyes and other material after evaporation of the DCM (top, in flask). FIG. 3B shows the clean-color flake before (left) and after (right) recovery from the DCM treatment. Most of the dyes have been extracted from the treated material, the blue colorant remaining is mostly insoluble pigments which are easily removed by filtration during a subsequent recycling process such as depolymerization. FIG. 4 shows the seven DCM solution time sequence samples (left). TABLE 1 shows the CIE color measurements of clean-color flake samples before (left) and after (right) DCM purification. As shown therein, the DCM purification of the original PET produced a resultant PET with improved optical qualities with $L^*$ increasing from 45.12 to 49.23 and significantly reduced color with $a^*$ decreasing from −9.22 to −2.6 (less green) and $b^*$ decreasing from +13.5 to +2.91 (less yellow).

TABLE 1

PRE AND POST COLOR REMOVAL FROM PET CLEAN-COLOR FLAKE

| | PET Flake as received | | | | PET Flake post color removal & dried | | | |
|---|---|---|---|---|---|---|---|---|
| Sample | $L^*$ | $a^*$ | $b^*$ | SD | Sample | $L^*$ | $a^*$ | $b^*$ | SD |
| 3 | 49.60 | −15.48 | 12.53 | 0.22 | 3 | 47.53 | −2.28 | 2.72 | 0.03 |
| 3 | 49.53 | −15.88 | 12.24 | | 3 | 47.76 | −2.53 | 2.79 | |
| 3 | 49.72 | −15.73 | 12.79 | | 3 | 47.41 | −2.54 | 2.74 | |
| Avg | 49.62 | −15.70 | 12.52 | | Avg | 47.57 | −2.45 | 2.75 | |
| 2 | 43.98 | −6.34 | 15.21 | 0.19 | 2 | 51.13 | −2.40 | 2.99 | 0.05 |
| 2 | 43.93 | −5.33 | 15.64 | | 2 | 51.29 | −2.32 | 3.07 | |
| 2 | 44.36 | −6.88 | 15.29 | | 2 | 51.57 | −2.27 | 3.11 | |
| Avg | 44.09 | −6.18 | 15.38 | | Avg | 51.33 | −2.33 | 3.06 | |
| 1 | 41.44 | −6.12 | 12.51 | 0.08 | 1 | 48.69 | −3.08 | 2.93 | 0.07 |
| 1 | 41.44 | −6.11 | 12.51 | | 1 | 48.82 | −3.08 | 2.85 | |
| 1 | 41.83 | −6.15 | 12.62 | | 1 | 48.84 | −2.91 | 3.01 | |
| 1 | 41.70 | −5.12 | 12.71 | | Avg | 48.78 | −3.02 | 2.93 | |
| Avg | 41.66 | −5.79 | 12.61 | | Total Avg | 49.23 | −2.60 | 2.91 | |
| Total Avg | 45.12 | −9.22 | 13.50 | | | | | | |

Figure 5:
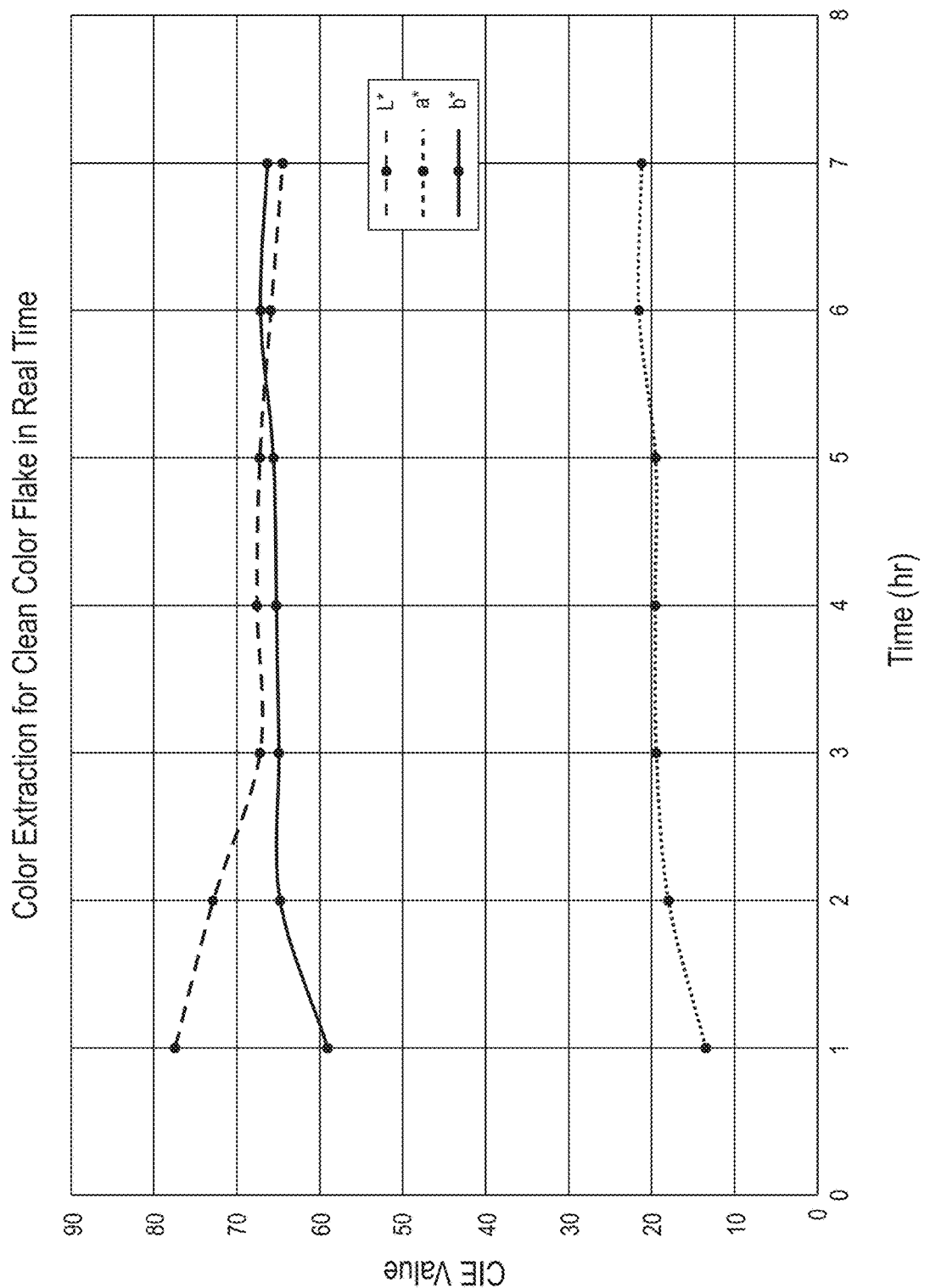
FIG. 5 is a graph that plots color extraction from DCM pre-treatment of PET clean-color flake in real time (Example 2).

$L^*$ = lightness from black (0) to white (100)
$a^*$ = green (−) to red (+)
$b^*$ = blue (−) to yellow (+)
SD = standard deviation TABLE 2 shows the CIE color measurements of the time sequence aliquots of the DCM liquid for the clean-color PET flake described herein and the curbside dirty-mixed PET flake from Example 1 and FIG. 5 is a graph that plots the color extraction data from TABLE 2 for the clean-color PET flake. The date in TABLE 2 and FIG. 5 show that decolorization occurs within two hours.

TABLE 2

COLOR EXTRACTION (SOLUTION) TIME SEQUENCE AT REAL TIME

| PET Flake Type @ Time | $L^*$ | $a^*$ | $b^*$ |
|---|---|---|---|
| Color @ 1 hr | 77.43 | 13.42 | 59.06 |
| Color @ 2 hr | 72.84 | 17.92 | 64.78 |

TABLE 2-continued

COLOR EXTRACTION (SOLUTION) TIME SEQUENCE AT REAL TIME

| PET Flake Type @ Time | $L^*$ | $a^*$ | $b^*$ |
|---|---|---|---|
| Color @ 3 hr | 67.20 | 19.38 | 64.93 |
| Color @ 3 hr | 67.57 | 19.50 | 65.23 |
| Color @ 4 hr | 67.24 | 19.48 | 65.58 |
| Color @ 5 hr | 65.90 | 21.51 | 67.15 |
| Color @ 6 hr | 64.47 | 21.16 | 66.30 |
| Color @ 7 hr | 62.31 | 22.60 | 66.93 |
| Dirty-mixed @ 1 hr | 91.23 | 0.95 | 18.46 |
| Dirty-mixed @ 2 hr | 90.69 | 0.81 | 20.27 |
| Dirty-mixed @ 3 hr | 90.24 | 0.71 | 21.18 |

Example 3

Glycolysis (VOLCAT) Depolymerization of Untreated Clean-Color Pet Flake

Post-consumer clean-color PET flake (1001 g) and EG (4501 g) were placed in a 2-gallon Parr-Pressure reactor and purged with nitrogen. The reactor was equipped with a stirrer, a condenser topped with a pressure regulator that was isolated from the reactor with a valve, a 300 mL takeoff below the condenser, and a catalyst addition burette. The reactor was sealed and the reaction mixture was heated to an internal temperature of about 220° C. with stirring (200 rpm using twin blade impeller shaft) at which time the internal pressure was observed to be about −10 psi. Next, TEA (52.6 grams) was added through the catalyst addition burette by pressurizing the headspace above the catalyst to about 30 psi and opening the valve briefly until the pressure started to rise in the reactor upon which the valve was closed. The reaction was stirred at this temperature for 1 hour, at which time the valve to the condenser was opened and the pressure of the reactor was lowered slowly through the condenser regulator until ambient pressure was reached while collecting the distillate containing the catalyst up to a temperature of 180° C. at ambient pressure. Next, the reaction was cooled to 90° C. at which point the reaction was filtered through a polypropylene mat covered with a fine layer of diatomaceous earth. After cooling the filtrate, BHET was recovered as a thick white slurry in ethylene glycol. This slurry was then vacuum filtered to recover the solid BHET which was compressed by application of a dental dam, rinsed with water, then sucked dry followed by drying in a vacuum oven at 65° C. Color measurements were made of the settled slurry, the dried BHET product and the recovered mother liquor obtained after filtration of the BHET.

Example 4

Glycolysis (VOLCAT) Depolymerization of Pre-Treated Clean-Color Pet Flake

The pre-treated clean-color PET flake from Example 2 (1004 g) and EG (4505 g) were placed in a 2-gallon Parr-Pressure reactor and purged with nitrogen. The reactor was equipped with a stirrer, a condenser topped with a pressure regulator that was isolated from the reactor with a valve, a 300 mL takeoff below the condenser, and a catalyst addition burette. The reactor was sealed and the reaction mixture was heated to an internal temperature of about 220° C. with stirring (200 rpm using twin blade impeller shaft) at which time the internal pressure was observed to be about ~10 psi. Next, TEA (53.0 grams) was added through the catalyst addition burette by pressurizing the headspace above the catalyst to about 30 psi and opening the valve briefly until the pressure started to rise in the reactor upon which the valve was closed. The remaining process conditions as described in Example 3 were repeated here. Color measurements were made of the settled slurry, the dried BHET product and the recovered mother liquor obtained after filtration of the BHET.

TABLE 3 compares the products obtained from the glycolysis depolymerization of the untreated clean-color flake (Example 3) and the DCM pre-treated clean-color flake described herein. The products are: (i) a slurry containing the BHET product in the EG mother liquor, (ii) the isolated solid BHET, and (iii) the liquid mother liquor. As shown TABLE 3, the DCM pre-treated fabric shows a large improvement in optical properties with L* increasing from 71.98 to 93.88, a* decreasing from 16.34 to −0.73 (less red), and b* decreasing from 62.73 to 26.31 (less yellow).

TABLE 3

COMPARISON OF PRODUCTS OBTAINED FROM GLYCOLYSIS (VOLCAT) DEPOLYMERIZATION OF CLEAN-COLOR FLAKE WITH AND WITHOUT PRETREATMENT

| Product from Clean-color PET Flake | L | a* | b* |
| --- | --- | --- | --- |
| Slurry from no pretreatment input | 75.84 | 3.21 | 13.77 |
| Slurry from with pretreatment input | 73.08 | −0.38 | 12.54 |
| BHET (dried solid) from no pretreatment input | 89.87 | 0.40 | 4.26 |
| BHET (dried solid) from with pretreatment input | 92.29 | −0.63 | 2.82 |
| Mother Liquor (liquid) from no pretreatment input | 71.98 | 16.34 | 62.73 |
| Mother Liquor (liquid) from with pretreatment input | 93.88 | −0.73 | 26.31 |

Example 5

Figure 6:
FIG. 6 are photographs showing the decolorization of black polyester fabric with DCM pre-treatment (Example 5).
Figure 6:
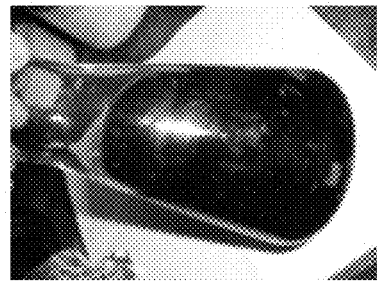
Figure 6:
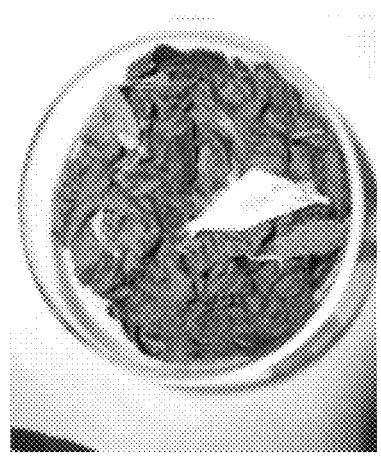
Figure 6:
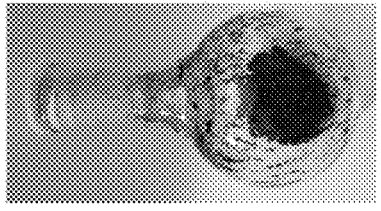

DCM Purification of Black Polyester Fabric 50 g of cut pieces of black polyester fabric with a polyurethane decal was stirred with 250 g DCM in a 500 mL Erlenmeyer flask at room temperature. The liquid turned deep purple almost immediately. The sample was filtered after 1 hour and 15 minutes, rinsed with DCM, and sucked dry at which time the fabric weighed 49.5 g. The polyurethane decal was found to have lifted from the fabric and the fabric had turned a light blue color. The extractables from the reaction were a dark black/purple color after evaporation of the DCM, weighing 1.9 g (3.8%). FIG. 6 shows the black input polyester fabric (left), the decolorization in DCM (left center), the post-decolorization polyester fabric (right center), and the recovered dyes after evaporation of DCM (right).

Example 6

Glycolysis (VOLCAT) Depolymerization of Untreated Black Polyester Fabric 50 g of black polyester fabric, 250 g EG, and 3.6 mL of TEA were sealed in a 450 mL glass Parr reactor with stirring (impeller flow facing down). The reaction was heated to 220° C. with stirring. After 30 minutes, the reactor was cooled to 100° C., filtered through a glass fiber matt, and treated with 10 g of activated carbon for 30 minutes at 90° C. The solution was then re-filtered through diatomaceous earth and allowed to cool to room temperature during which time crystals formed. The BHET crystals were vacuum filtered, compressed using a dental dam, rinsed with water and dried first with vacuum on the filter then in a vacuum oven at 65° C. overnight.

Example 7

Figure 7:
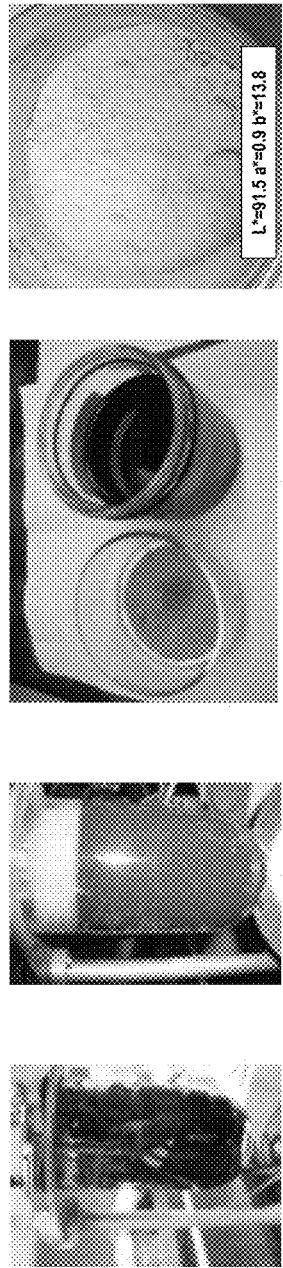
FIG. 7 are photographs showing the depolymerization of black polyester fabric with and without DCM pre-treatment (Example 7).
Figure 7:
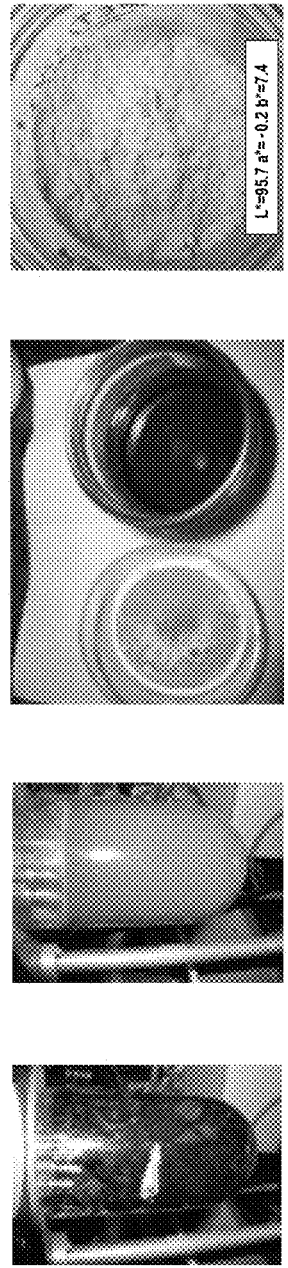

Glycolysis (VOLCAT) Depolymerization of Pre-Treated Black Polyester Fabric 25 g of black polyester fabric, 250 g EG, and 3.6 mL of TEA were sealed in a 450 mL glass Parr reactor with stirring (impeller facing down). The reaction was heated to 220° C. with stirring. After 30 minutes, the reactor was cooled to 100° C., filtered through a glass fiber matt, and treated with 10 g of activated carbon for 30 minutes. The solution was then re-filtered through diatomaceous earth and was noted to be of much lighter color than that of Example 4. After cooling to room temperature, crystals formed. The BHET crystals were vacuum filtered, compressed using a dental dam, rinsed with water and dried first with vacuum on the filter then in a vacuum oven at 65° C. overnight. FIG. 7 shows VolCat depolymerization of (i) the untreated black polyester fabric of Example 4 (top panels) and (ii) the pre-treated black polyester fabric described herein (bottom panels). The CIE color values of the resultant BHET products (FIG. 7, far right panels) show the following values between the untreated and pre-treated fabric samples, respectively: improved whiteness (L*) of 91.5 to 95.7, removal of redness (a*) of 0.9 to −0.2, and a large decrease in yellowness (b*) of 13.8 to 7.4.

Example 8

Figure 8:
FIG. 8 are photographs showing removal of red colorants from a red 60/40 cotton/polyester fabric (Example 8).

DCM Purification of Red 60/40 Cotton/Polyester Fabric 71.3 grams of 60/40 red colored cotton/polyester fabric was rolled overnight at room temperature in 750 g DCM. The next morning the fabric was filtered, then wrung to remove most of the DCM, rinsed with two 75 mL quantities of additional DCM. The DCM was recovered on a rotary evaporator to obtain 1.0 g of a red solid. The fabric was resuspended in the recovered DCM and again rolled overnight. The fabric was again filtered, wrung to remove most of the DCM, and dried. The DCM was recovered using a rotary evaporator and a total combined mass of 1.2 g of red solid obtained. The fabric weighed 69.8 g after drying, a loss of 1.5 g (2.1%). FIG. 8 shows the fabric as received (left), the colorants extracted from the fabric with the DCM treatment (center), and the fabric post-treatment (right).

We claim:

1. A method comprising:
   purifying a waste material comprising a polyester by treating the waste material with dichloromethane (DCM) to form a DCM-treated waste product;
   recovering purified polyester from the DCM-treated waste product; and
   recycling the purified polyester by a chemical recycling process.

2. The method of claim 1, wherein the chemical recycling process is selected from the group consisting of solvent dissolution, alcoholysis, hydrolysis, acidolysis, phosphorolysis, aminolysis, ammonolysis, and enzymolysis.

3. The method of claim 1, wherein the chemical recycling process comprises solvent dissolution.

4. The method of claim 1, wherein the chemical recycling process comprises glycolysis depolymerization.

5. The method of claim 1, wherein the purified polyester is recycled by a mechanical recycling process.

6. The method of claim 1, wherein the DCM treatment removes impurities selected from the group consisting of non-ester polymers, physical dirt and/or grime, colorants, organic impurities, and metallic and ionic impurities.

7. The method of claim 1, wherein the purified polyester comprises a solid component and a liquid component, wherein contaminants float to the surface of the liquid component and are removed by filtering the contaminants from the surface of the liquid component.

8. The method of claim 1, wherein the purified polyester comprises a solid component and a liquid component and contaminants are removed from the purified polyester sample by filtration.

9. The method of claim 1, wherein the waste material further comprises non-polyester polymers, wherein the non-polyester polymers are recovered for recycling.

10. The method of claim 1, wherein the waste material is polyester terephthalate (PET).

11. A method comprising:
    purifying a waste material comprising a polyester by treating the waste material with dichloromethane (DCM) to form a DCM-treated waste product;
    recovering purified polyester from the DCM-treated waste product; and
    recycling the purified polyester by a mechanical recycling process.

12. The method of claim 11, wherein the DCM removes impurities selected from the group consisting of non-ester polymers, physical dirt and/or grime, colorants, organic impurities,
    and metallic and ionic impurities.

13. The method of claim 11, wherein the purified polyester comprises a solid component and a liquid component, wherein contaminants float to the surface of the liquid component and are removed by filtering the contaminants from the liquid component.

14. The method of claim 11, wherein the purified polyester comprises a solid component and a liquid component and contaminants are removed from the purified polyester sample by filtration.

15. The method of claim 11, wherein the waste material further comprises non-polyester polymers, wherein the non-polyester polymers are recovered for recycling.

16. The method of claim 11, wherein the waste material is polyester terephthalate (PET).

* * * * *